United States Patent [19]
DeYoung

[11] 4,165,664
[45] Aug. 28, 1979

[54] APPARATUS FOR CUTTING CANS

[76] Inventor: Richard E. DeYoung, 182 Captains Quarters, Roswell, Ga. 30076

[21] Appl. No.: 896,292

[22] Filed: Apr. 14, 1978

[51] Int. Cl.$^2$ .................... B23D 21/14; B23D 29/02
[52] U.S. Cl. ........................................ 83/188; 83/195; 83/574; 83/614; 30/296 R
[58] Field of Search ............... 83/185, 195, 188, 574, 83/614, 191; 30/231, 296 R; 744/136 H

[56] References Cited
U.S. PATENT DOCUMENTS

| 898,289 | 9/1908 | Voorhies | 144/136 H |
|---|---|---|---|
| 1,555,391 | 9/1925 | Surfus | 83/614 |
| 2,822,871 | 2/1958 | Malek | 30/231 |
| 3,489,045 | 1/1970 | Ray | 83/195 |
| 3,648,743 | 3/1972 | Fino et al. | 144/312 X |

Primary Examiner—Donald R. Schran
Attorney, Agent, or Firm—Richard D. Dixon

[57] ABSTRACT

The present invention relates to an apparatus for making cuts along the circumferential surface of a can. The apparatus includes a frame and a plurality of rollers rotatably coupled to the frame for receiving and movably supporting the circumferential surface of the can. A cutter is provided for cutting along the circumferential surface of the can. A guide is coupled to the cutter and to the frame in known registration with the rollers for movably guiding the cutter along the desired cutting path over the circumferential surface of the can.

In a first preferred embodiment of the present invention the rollers are arranged so as to allow the can to rotate about its central cylindrical axis. The rollers are elongated and cylindrical in form and each has an axis of rotation generally parallel with the central cylindrical axis of the can.

10 Claims, 6 Drawing Figures

APPARATUS FOR CUTTING CANS

BACKGROUND OF THE INVENTION

I. Field of the Invention

The present invention relates to an apparatus for making cuts along the circumferential surface of a can or other similar container. The present invention is primarily intended for use in making decorative articles from cylindrical cans, but the apparatus may also be used for splitting cans which hold nursery plants.

II. Description of the Prior Art

Can openers for the classic "tin can" are well known in the art. These tin cans have long been used for a multiplicity of purposes, including housing of nursery plants, storage of miscellaneous articles, the transportation and storage of food, etc. Since the planar ends of these tin cans are permanently closed during the loading process, it has been necessary for the purchaser or the user of the can to utilize an opener designed for that purpose. Typically these can openers progressed from an exposed knife-like utensil to the more sophisticated roller and shielded knife utensils.

For example, the disclosure of Hansen, in U.S. Pat. No. 1,522,055 illustrates the use of a knife or shielded knife type can opener which is designed to cut not only the planar ends of the can but also around and along the circumferential surface of the can. However, Hansen has not provided any guide or positioning means by which the operator can carefully align and regulate the precise cutting line along the can. Kawahara, in U.S. Pat. No. 2,970,375, discloses an improved can opener which employs a knife-like cutting element which communicates upwardly along a movable shoe or plate element. Seerup, in U.S. Pat. No. 816,256, discloses a can opening apparatus which couples to the circumferential surface adjacent the planar end of the can and employs a knife-like appendage which penetrates and cuts around the circumferential surface of the can. Whatley, in U.S. Pat. No. 2,714,247, discloses an improved safety can opener apparatus which utilizes a sharpened wheel which engages and rotatably pierces the planar end of the can.

Armstrong, in U.S. Pat. No. 2,602,993, discloses a can opening apparatus specifically designed for allowing a gardener to separate the tin can from the potting soil and plant located therewithin. This can opener includes an extended handle and a foot pedal for allowing the operator to steady the can opener and to use the force of this foot for moving the can opener vertically along the circumferential surface of the can from one planar end to the other planar end, thereby placing a slit or cut longitudinally along the circumferential surface of the can. Several of these cuts will allow the gardener to peel back the circumferential surface of the can and remove the potting soil and plant as a unit therefrom. Lassen, in U.S. Pat. No. 2,719,358, discloses a shaft-like strap cutter which includes a sharpened slot in the operative end thereof for engaging with and cutting a strap.

The old style "tin cans" were primarily functional in nature in that they were not aesthetically or artistically pleasing to the eye. That is, their principle use was limited to containing or storing articles. Since the tin cans were constructed from a relatively thick and hard substance, such as steel plated on both sides with a layer of tin, it was unusual to find uses for the can which required the can to be cut apart or segmented. However, with the advent of aluminum cans it has become much more feasible for the artistically inclined person to use these softer and thinner cans for other uses. For example, aluminum can sculpters and aluminum can pop art now are well known. A relatively new art form requires that the aluminum cans be cut into thin strips and then these thin strips are cut to the appropriate length and curled or bent in order to form an ornamental shape. One form of aluminum can art requires the aluminum can to be cut a plurality of times generally along the longitudinal axis of the circumferential surface of the can in order that the resulting strips may be curled to form ornamental spirals adjacent one end of the can. Then, a plurality of the can ends having the curled ornamental objects around the perifery thereof are coupled together for forming some unique work of can art such as a chair, a sofa, replicas of animals, etc.

These aluminum cans may be cut into longitudinal strips by the use of ordinary manual tin snips or metal shears, but this manual method does not lend itself to creating strips which are evenly spaced and of constant width from one end to the other. The can openers which have been previously described above are likewise not suited for making these longitudinal cuts in the circumferential surface of the cans.

Therefore, it is first object of the present invention to provide an apparatus for making cuts of generally constant width which are equally spaced along the typical aluminum can or other similar container.

Another object of the present invention is to specifically adapt the cutter for making these cuts longitudinally along the circumferential surface of the aluminum can. Precise incremental motion devices are provided for accurately and evenly spacing the cuts around the circumference of the can.

A still further object of the present invention is to incorporate the use of linear cutting, shear-type cutters which will not leave jagged or burred edges along the strips, but will instead make smooth, even cuts which will not cause the aluminum strips to bend or misform.

SUMMARY OF THE INVENTION

The present invention relates to an apparatus for cutting along the circumferential surface of a can. The cutting device includes a frame having a plurality of rollers rotatably coupled thereto for receiving and movably supporting the circumferential surface of the can. Cutter means are provided for cutting along the circumferential surface of the can. Guide means are coupled to the cutter means and the frame in known registration with the rollers for movably guiding the cutter means along the desired cutting path over the circumferential surface of the can.

In the first preferred embodiment of the present invention the rollers are arranged so as to allow the can to rotate about its central cylindrical axis. Also, the rollers have an elongated cylindrical form in which the axis of rotation of each of the rollers is generally parallel with the central cylindrical axis of the can.

BRIEF DESCRIPTION OF THE DRAWINGS

Other objects, features and advantages of the present invention will be apparent through a study of the written description and the drawings in which.

DETAILED DESCRIPTION OF THE PREFERRED EMBODIMENT

Figure 1:
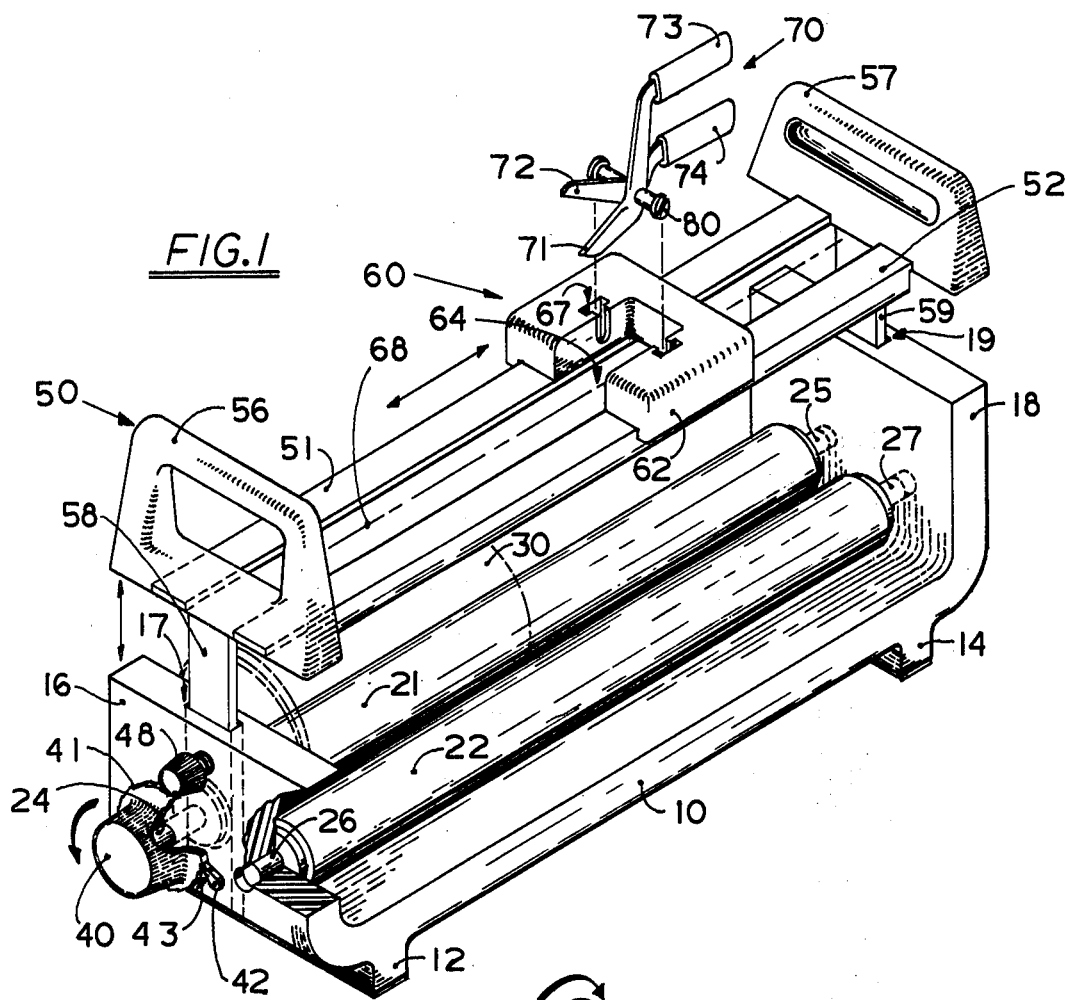
FIG. 1 illustrates the frontal top perspective view of a first preferred embodiment of the can cutting apparatus in accordance with the present invention.

A first preferred embodiment of the can cutting apparatus in accordance with the present invention is illustrated generally in FIG. 1. The apparatus includes a generally U-shaped frame 10 which includes two downward projecting feet members 12 and 14 to which are attached rubber foot pads. Two upstanding end elements 16 and 18 on the frame 10 define therebetween a void into which the can is placed.

Figure 4:
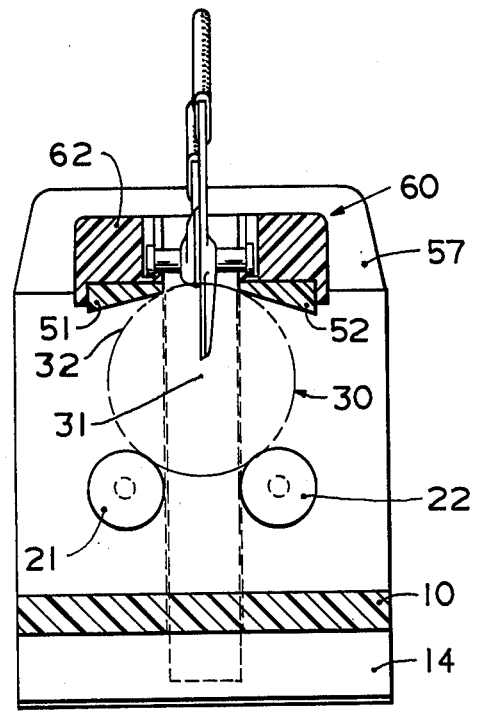
FIG. 4 illustrates an end cross-section view of the first preferred embodiment of the present invention as taken along section lines 4—4 in FIG. 1.

A pair of generally cylindrical and elongated rollers 21 and 22 are located within the void defined by the upstanding side numbers 16 and 18 of the frame 10. The longitudinal axes and rotational axes of these longitudinal rollers 21 and 22 are oriented generally parallel to each other and to the bottom horizontal element of the frame 10. An outside communicative surface of the rollers 21 and 22 are covered with a rubber frictional substance in order to prevent slippage when communicating with a can 30 coupled thereto. As illustrated in FIG. 4, the separation between the rollers 21 and 22 is generally determined such that the can 30 will be centered therebetween and a central axis or rational axis 31 of the can 30 will lie in a plane bisecting the plane defined by the rotational axies of the two rollers 21 and 22.

The first end of the roller 21 includes a shaft 24 which communicates through an aperature bushing within the upstanding side 16 of the frame 10. A ratchet knob 40 is coupled to the distended end of the shaft 24 for manually controlling the rotation thereof. A plurality of ratchet teeth 41 are spaced evenly about the circumference of the ratchet knob 40 for being engaged for being engaged by a ratchet stop 42. The ratchet stop 42 is movably biased by the operation of a ratchet spring 43 into the teeth 41 about the circumference of the ratchet knob 40 for preventing the reverse rotation of shaft 24 and the roller 21 coupled thereto. The ratchet stop 42 when coupling with the ratchet teeth 41 of the ratchet knob 40 also limits to an incremental rotational motion the angular displacement between the roller 21 and the frame 10. In a first preferred embodiment of the present invention the ratchet knob 40 includes 64 ratchet teeth 41 about the circumference thereof in order divide the complete revolution of ratchet knob 40 into at least four quadrants of sixteen equal segments each.

A shaft 25 at the opposite of the roller 21 as well as shafts 26 and 27 at the opposite ends of the roller 22 are movably and freely coupled through corresponding bushings located in the upstanding sections 16 and 18 of the frame 10 for allowing the corresponding rollers 21 and 22 to freely rotate therein. In this manner the can 30 when in communication with the first roller 21 may be incrementally rotated by turning the ratchet knob 40 the desired number in incremental steps. Since the circumferential surface 32 of the can 30 is in supportive and frictional communication with the external circumferential surfaces of the rollers 21 and 22, any motion of the first roller 21 will cause a resulting rotation of the can 30 which in turn will cause a corresponding rotation of the roller 22.

The proper frictional or pressing communication between the can 30 and the rollers 21 and 22 is effected by the operation of the guide means, shown generally as 50. The operative elements of the guide means 50 include a first guide bar 51 and a second guide bar 52 positioned immediately adjacent thereto and substantially parallel therewith. The spacing between the guide bars 51 and 52 is generally maintained by the attachment of a first handle 56 and a second handle 57 attached to opposite ends thereof. The first handle 56 has attached to an underside thereof a vertical elevator rod 58 which freely communicates through a corresponding aperature 17 within the upstanding end 16 of the frame 10. A locking or knurled fastener 48 communicates through a threaded bore within the upstanding side 16 and communicates against the vertical elevator rod 58 to adjustably lock the vertical position of the guide means 50. Likewise, another vertical elevator rod 59 is attached to the underside surface of the second handle 57 for communicating through a corresponding aperature 19 within the generally upstanding end 18 of the frame 10. In this manner the guide bars 51 and 52 may be manually raised and lowered in precise vertical and horizontal registration with the rollers 21 and 22.

With specific reference to FIG. 4, the end sections of the guide bars 51 and 52 are shown to be truncated triangular shapes which are oriented such that any communication between the circumferential surface 32 of the can 30 and the lower surfaces of the guide bars 51 and 52 will produce a stabilizing force which directs the motion of the can 30 back into its equilibrium position characterized by the central axis 31 being located equaldistant from each of the rollers 21 and 22. In this manner a downward pressure is exerted by the guide bars 51 and 52 which forces the can 30 to rest in an equilibrium position such that the central axis 31 of the can 30 is in know registration with the rollers 21 and 22, the frame 10 and the guides 51 and 52.

This registration relationship is retained regardless of the diameter of the can which is placed upon the rollers 21 and 22. The first preferred embodiment of the present invention is designed to accommodate cans having an external diameter of between $2\frac{1}{4}''$ to $9\frac{1}{2}$ inches. While the first preferred embodiment has been illustrated with the use of a generally cylindrical can 30, it should be recognized that cans having various other shapes may be cut with this apparatus without a substantial loss in the effectiveness or the accuracy of the registration technique. For example, a generally square can may be cut using the present apparatus by merely placing one of the square sides upon the two rollers 21 and 22 and incrementally adjusting the horizontal position of the can by the use of the ratchet knob 40. It should also be noted that while the first preferred embodiment of the present invention anticipates the use of a high strength polyvinylchloride substance for most of the parts, these parts may also be constructed of other rigid metals or substitute materials with equal effectiveness.

With continuing reference to FIGS. 1 and 4, cutter means 60 are provided for riding upon the guide bars 51 and 52 while cutting the can 30. The cutter means 60 includes a sliding base 62 which defines therein a generally vertical slot 64 and a generally horizontally slot 66. The horizontal slot 66 is adapted to congruently couple with the outside edges of the guidebars 51 and 52 for regulating the linear motion of the base 62 as it moves along the guide-bars 51 and 52. In the first preferred embodiment of the present invention a central axis or cutting axis 68 is defined within the base 62 as a bisector of the horizontal slot 66 and the vertical slot 64. Also, the cutting axis 68 is typically a bisector of the space defined between the guide-bars 51 and 52 of guide means 50.

Figure 5:
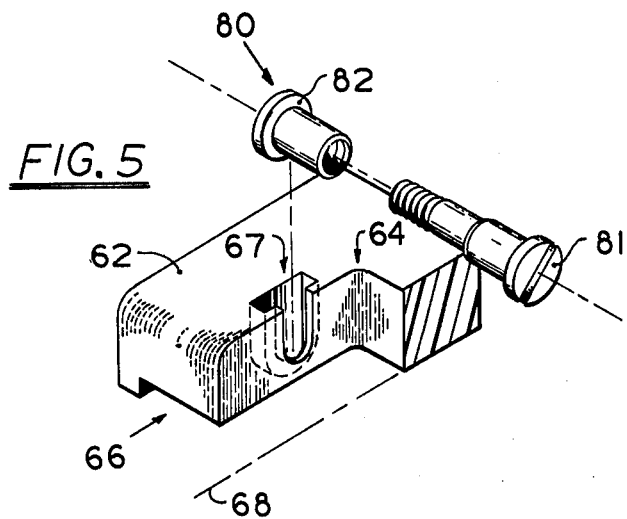
FIG. 5 illustrates an exploded perspective view of the cutting base and the alignment which couples into the recesses therewithin.
Figure 6:
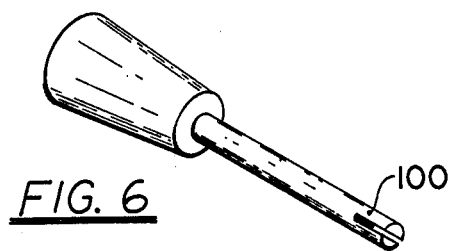
FIG. 6 is perspective view of a curling tool in accordance with the present invention.

The cutter means 60 also includes a pair of shear-type cutters 70 which include a first cutting element 71 having a handle 73 coupled thereto and a second cutting element 72 having a handle 74 coupled thereto. The first cutting element 71 and the second element 72 are movably coupled together by an alignment pin, shown generally as 80 in FIGS. 4 and 5. This alignment pin 80 has enlarged heads 81 and 82 located at the distended ends thereof for coupling within recessed channels 67 defined within the sliding base 62 on opposite sides of the vertical slot 64. In this manner the alignment pin 80 retains the proper registration between the shear-type cutters 70 and the guide means 50. The first cutting element 71 and the second cutting element 72 are designed to be straight cutters in order to prevent the curling or burring of the sections of the can cut from the main section thereof. As illustrated in FIG. 5, the alignment pin 80 includes intermediate the enlarged heads 81 and 82 a section of reduced diameter for coupling through and compressing together the first cutting element 71 and the second cutting element 72 compromising the shear-type cutters 70.

Thus, the first preferred embodiment of the apparatus for can-crafting has been described. This first preferred embodiment is specifically designed to cut aluminum cans into a maximum of 64 evenly spaced and constant width spokes which are required for can-crafting. The apparatus will handle any ordinary can, either aluminum or tin, with a typical diameter of 2.5 inches (such as the standard 12 ounce beer or soft drink can) to a maximum outside diameter of 10 inches (such as a 1 gallon paint can). The apparatus will enable the operator to cut a plurality of spokes from the circumferential surface of the can without having to mark off and hand guide the shears. The spokes may then be twisted, bent and/or curled into can creations limited only by the imagination of the artisian.

The method to be utilized in conjunction with the proper operation with the first preferred embodiment of the present invention will now be described with reference to FIGS. 1 and 4. First, the frame 10 of the apparatus is placed upon an immovable workbench. Next, the knurled fastner 48 is screwed counterclockwise in order to disengage from communication with the vertical elevator rod 58, thus freeing the vertical motion of the guide means 50. It is presumed that the operator has performed the preliminary steps of cutting one planar end of the can from the circumferential surface attached thereto. The can 30 should then be washed and rinsed both on the inside and outside surfaces. All labels should be removed.

The guide means 50 are then elevated in order to allow the operator to place the circumferential surface 32 of the can 30 upon the rollers 21 and 22 such that the central axis 31 of the can 30 is generally parallel with the rotational axes of the rollers 21 and 22. Next, the guide means 50 is lowered until the underneath side of the guide bars 51 and 52 communicate with the upper circumferential surface 32 of the can 30. A slight fingertip pressure on the handles 56 and 57 will ensure the proper coupling communication between the can 30 and the rollers 21 and 22. The knurled fastener 48 is then rotated clockwise in order to communicate against the vertical elevator rod 58 for preventing any further vertical motion of the guide means 50.

Next, the operator must rotate the ratchet 40 in order to determine if the can 30 rotates upon the rollers 21 and 22. If no rotation of the can 30 is observed, the downward pressure from the guide means 50 upon the can 30 must be adjusted as required. It will further be assumed that the operator has inserted the can 30 such that the closed planar end of the can is immediately adjacent the upstanding end 16 of the frame 10 while the open end of the can 30 points toward the opposite upstanding end 18. Next, the first and second cutting element 71 and 72 of the shear-type cutters 70 are opened and engaged with the open end of the can 30. The operator then makes the series of sequential colinear cuts along the circumferential surface of the can 30 as the shear-type cutters 70 are guided along the guide bars 51 and 52. Typically this axial cut in the circumferential surface of the can 32 extends only to within ¼ to ½ inches of the closed end of the can 30. Next, the shear-type cutter 70 are moved backwards along the guide-bars 51 and 52 in order to disengage from the cut made within the can 30. The operator then rotates the ratchet knob 40 at least one increment, engages the shear-type cutters 70 again with the open end of the can 30, and then proceeds to make another longitudinal cut in the circumferential surface 32 of the can 30.

In this manner a plurality of spokes or linear sections may be cut from the can as required. As soon as the last cut has been made within the can 30, the knurled fastener 48 is loosened and the guide means 50 are elevated out of communication with the can 30. The can 30 may then be removed from communication with the rollers 21 and 22 for subsequent use. It should be noted at this point that the structural integrity of the can 30 is preserved throughout this operation by leaving the ¼ to ½ inch rim about the closed end of the can 30.

Figure 2:
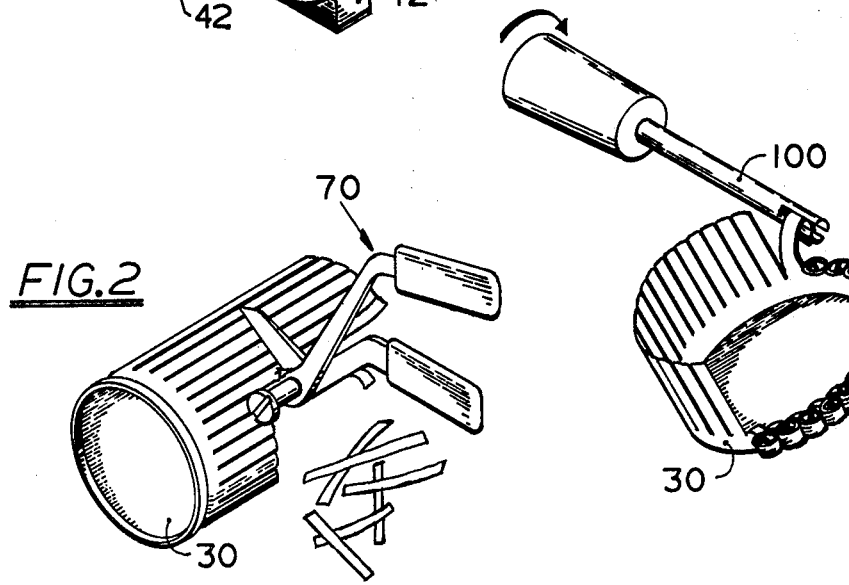
FIG. 2 illustrates the separate use of the cutters for trimming the length of the strips of the aluminum can which have been created by use of the can cutter.
Figure 3:
FIG. 3 illustrates the use of a curling tool in accordance with the present invention.

It may then be desirable for the operator to remove the shear-type cutters 70 from the normal communication within the sliding base 62 in order to trim to the desired length the longitudinal length of the spokes as illustrated in FIG. 2. Next, as illustrated in FIG. 3, the end notch within the curling tools 100 are used to engage and curl the individual spokes cut within the circumferential surface of the can 30. The shear-type cutters 70 may be replaced within the vertical slot 64 of the sliding base 62 in order to prepare the apparatus for cutting the next can.

In this manner various cylindrical and other shaped cans may be cut into a plurality of evenly spaced spokes. While the first preferred embodiment of the present invention is typically designed for cutting aluminum or tin cans, it may also be used for cutting cans made of other materials such as plastic, etc.

Thus, the first preferred embodiment of the can-crafting apparatus and method have been described as an example of the first preferred embodiment of the present invention. However, the present invention should not be limited in its application to the details and construction illustrated in the accompanying drawings or the specification, since this invention may be practiced or constructed in a variety of other different embodiments without departing from the spirit or the scope of the appended claims. Also, it must be understood that the terminology and descriptions employed herein are used solely for the purpose of describing the preferred embodiment and the general process, and therefore these should not be construed as limitations on the operability of the invention.

I claim:

1. A device for cutting along the circumferential surface of a can, said device comprising in combination:
   a frame;
   support means coupled to said frame for receiving and movably supporting the circumferential surface of the can;
   cutter means for cutting along the circumferential surface of the can; and
   guide means coupled to said cutter means and said frame in known registration with said support means, said guide means for movably guiding said cutter means along an average guide axis which is generally parallel with a cylindrical axis of the can; whereby the circumferential surface of the can may be cut into a plurality of longitudinal strips.

2. The can cutting device as described in claim 1 wherein said support means supports the circumferential surface of the can so as to allow the can to rotate about its central cylindrical axis.

3. The can cutting device as described in claim 2 wherein said support means comprises elongated cylindrical rollers having axies of rotation each generally parallel with the central cylindrical axis of the can.

4. The can cutting device as described in claim 3 wherein said guide means includes paired parallel guide rails spaced from each other so as to define therebetween said average guide axis.

5. The can cutting device as described in claim 4 wherein said guide means further includes elevator means movably coupled to said frame and said guide rails for elevating said guide rails to allow easy access when coupling the can with said rollers, and for lowering said guide rails until adjacent the circumferential surface of the can for operation of said cutter means.

6. The can cutting device as described in claim 3 further including incremental positioning means coupled to at least one of said rollers and to said frame for regulating the incremental rotational motion therebetween, whereby the can may be rotated in finite increments for making generally parallel and evenly spaced cuts along the circumferential surface of the can.

7. The can cutting device as described in claim 6 wherein said incremental positioning means comprises ratchet means operably interposed between one of said rollers and said frame.

8. The can cutting device as described in claim 6 wherein said cutter means comprises in combination:
   a base for movably coupling with said guide means; and
   shear-type cutters movably coupled to said base such that a shearing axis of said shear-type cutters moves generally along said average guide axis.

9. The can cutting device as described in claim 8 wherein said shear-type cutters are movably coupled to said base for being detached and used separately from said cutter means.

10. The can cutting device as described in claim 9 wherein said shear-type cutters include a first cutting element and a second cutting element operatively coupled together by a central pivot pin of the type having enlarged heads at the distended thereof, and with said base including a slot for receiving therein said shear-type cutters, with said base also including therein adjacent said slot paired recessed channels for removably coupling with said enlarged heads of said central pivot pin, thereby restraining the shear-type cutters in known registration with said average guide axis.

* * * * *